US009468149B2

(12) United States Patent
Derscheid et al.

(10) Patent No.: US 9,468,149 B2
(45) Date of Patent: Oct. 18, 2016

(54) ARTICULATING FLOOR OF MACHINE

(71) Applicant: Deere & Company, Moline, IL (US)

(72) Inventors: Daniel E. Derscheid, Hedrick, IA (US); Eric R. Lang, Vinton, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/612,608

(22) Filed: Feb. 3, 2015

(65) Prior Publication Data

US 2016/0219789 A1 Aug. 4, 2016

(51) Int. Cl.
*A01F 15/10* (2006.01)
*A01D 89/00* (2006.01)
(Continued)

(52) U.S. Cl.
CPC ........... *A01F 15/10* (2013.01); *A01D 89/001* (2013.01); *A01D 90/08* (2013.01); *A01F 29/04* (2013.01);
(Continued)

(58) Field of Classification Search
CPC .... A01F 15/10; A01F 15/101; A01F 15/102; A01F 29/00; A01F 29/10; A01F 29/04; A01F 12/40; A01F 2015/102; A01F 2015/107; A01F 2015/108; A01D 90/04; A01D 89/001; A01D 90/08; A01D 2090/086
USPC ....... 100/179, 188 R, 189; 56/341, 343, 344, 56/443, 446, 16.4 R; 241/342, 287
See application file for complete search history.

(56) References Cited

U.S. PATENT DOCUMENTS 6,298,646 B1 * 10/2001 Schrag .................. A01F 15/101
100/88
6,769,239 B1 * 8/2004 Webb ..................... A01D 90/04
56/341

(Continued)

FOREIGN PATENT DOCUMENTS

DE 198 41 598 A1 3/2000
EP 1153539 A1 11/2001
(Continued)

OTHER PUBLICATIONS

Vicon; "Variable Chamber Balers"; Accessed on Jan. 6, 2016 at http://www.vicon-machinery.com.au/uploaded/ ebrochure/ Variable%20round%20chamber%20baler/RV2100Balers.pdf; 16 pages.

(Continued)

*Primary Examiner* — Jimmy T Nguyen
(74) *Attorney, Agent, or Firm* — Taft Stettinius & Hollister LLP; Stephen F. Rost

(57) ABSTRACT

A baler includes a frame, a pickup mechanism, and a pre-compression chamber coupled to the frame rearward of the pickup mechanism. A material flow is defined at least between the pickup mechanism and pre-compression chamber. The baler includes a feeder system coupled to the frame along the material flow path and between the pickup mechanism and the pre-compression chamber. The feeder system includes a feeding mechanism for transferring crop received from the pickup mechanism to the pre-compression chamber. The feeding system includes a floor assembly and knife system. The floor assembly is pivotably coupled to the frame about a pivot to move between a raised position and a lowered position. The pivot is located rearward of the pickup mechanism and feeding mechanism such that the floor assembly and knife system pivot from the raised position to the lowered position in a direction downwardly and towards a rear of the baler.

23 Claims, 12 Drawing Sheets

(51) Int. Cl.
*A01D 90/08* (2006.01)
*A01F 29/10* (2006.01)
*A01F 29/04* (2006.01)

(52) U.S. Cl.
CPC ......... *A01F 29/10* (2013.01); *A01D 2090/086* (2013.01); *A01F 2015/102* (2013.01); *A01F 2015/107* (2013.01); *A01F 2015/108* (2013.01)

(56) References Cited

U.S. PATENT DOCUMENTS

| | | | | |
|---|---|---|---|---|
| 7,404,284 | B2* | 7/2008 | Viaud | A01F 17/00 100/6 |
| 8,141,805 | B1* | 3/2012 | Isaac | A01F 12/40 241/242 |
| 2002/0011061 | A1* | 1/2002 | Lucand | A01D 90/04 56/341 |
| 2011/0174171 | A1* | 7/2011 | Viaud | A01F 15/085 100/76 |
| 2012/0240793 | A1* | 9/2012 | Dedeurwaerder | A01F 15/042 100/3 |
| 2014/0096692 | A1* | 4/2014 | Baldauf | A01F 15/10 100/97 |
| 2016/0057937 | A1 | 3/2016 | McClure | |

FOREIGN PATENT DOCUMENTS

| | | |
|---|---|---|
| EP | 1584226 A2 | 10/2005 |
| EP | 2659762 A1 | 11/2013 |

OTHER PUBLICATIONS

Kverneland; "New Parallelogram DropFloor system for easy unblocking"; Accessed on Jan. 6, 2016 at http://ien.kverneland.com/Bale-Equipment/Round-Balers/Features/New-Parallelogram-DropFloor-system-for-easy-unblocking#. VDPqKBY8D-E; 1 page.
New Holland; "Roll-Belt Series Round Balers"; Accessed on Jan. 6, 2016 at http://ien.kverneland.com/Bale-Equipment/Round-Balers/Features/New-Parallelogram-DropFloor-system-for-easy-unblocking#. VDPqKBY8D-E; 28 pages.
Extended European Search Report, EP Application Ser. No. 16153423.5, dated Jun. 14, 2016, pp. 1-7.

* cited by examiner

ARTICULATING FLOOR OF MACHINE

FIELD OF THE DISCLOSURE

The present disclosure relates to a work machine for baling crop, and more particularly to a baler for baling cut crop including an articulating floor.

BACKGROUND

Hay and foraging equipment are utilized in the processing of plant material and include mowers, conditioners, flail choppers, windrowers, and balers for both dry and silage uses. The hay system, such as a square baler, includes a pickup mechanism, which picks crop material from the ground and supplies it to a bale-forming chamber. The bale-forming chamber receives the crop material and includes a plunger or piston that applies an axial force against an accumulation of the crop material to form a substantially square-shaped bale. The plunger or piston can further apply a force to a face of the bale to further densify the bale. Once the bale reaches a certain or desired density, the bale may be pushed and extruded out the rear of the baler.

As the baler is driven across the field encountering crop material, the crop material may be bunched or otherwise non-uniformly distributed causing surges in the amount of power required from the power source to process the material encountered. If the material encountered is too thick or even includes some foreign material such as a piece of wood or a stone, a plug can be formed that causes the baling mechanism to be overloaded. In some machines, this requires operator intervention requiring the operator to stop the tractor and try to unplug it by perhaps reversing the travel of the tractor to try to pull some of the material out. The encountering of a plug often requires the operator to stop the drive mechanism and then release various aspects of the baler mechanism associated with the flow of the material so that the plug can be removed either manually or by operating portions of the baler with mechanisms in their non-normal operating positions to try to clear the plug from the baler. Once the plug is removed, the operator then goes and repositions the mechanisms that were disengaged, moving them back into a normal operating position. These conventional techniques require at least some limited operator intervention and the operator can even potentially damage the machine by operating it with only some of the mechanisms being moved to a released position.

In other aspects, various unplugging devices are included in the feeding systems on hay and forage equipment which include drop floors, knife disengagement, reversers, rotor movement, pickup baffle positioners, power feed clutches, and the like. These devices are activated electrically, hydraulically, PTO driven, or a combination thereof. These devices are activated individually to make the necessary steps to relieve tight plugs and to then sequentially feed crops through the feeding device. Actuating these devices individually is cumbersome, time-consuming and difficult to understand for inexperienced operators.

SUMMARY

In one embodiment of the disclosure, a baler includes a frame; a pickup mechanism coupled to the frame, the pickup mechanism adapted to collect crop; a pre-compression chamber coupled to the frame rearward of the pickup mechanism; a material flow path defined at least between the pickup mechanism and pre-compression chamber; a feeder system coupled to the frame along the material flow path and between the pickup mechanism and the pre-compression chamber, the feeder system including: a feeding mechanism for transferring crop received from the pickup mechanism to the pre-compression chamber; a floor assembly positioned at least partially below the feeding mechanism, the floor assembly being pivotably coupled to the frame about a pivot to move between a raised position and a lowered position; a knife system coupled to the floor assembly, the knife system including one or more knives oriented, at least in part, along the material flow path; wherein, the pivot is located rearward of the pickup mechanism and feeding mechanism such that the floor assembly and knife system pivot from the raised position to the lowered position in a direction downwardly and towards a rear of the baler.

In one example of this embodiment, a plug location may be disposed along the material flow path and defined between the pickup mechanism and the floor assembly in the raised position, wherein the pivot is located rearward of the plug location. In a second example, the baler may include at least one actuator for controllably pivoting the floor assembly about the pivot, the actuator having a first end and a second end, wherein the first end is coupled to the floor assembly and the second end is coupled to the frame. In a third example, the feeding mechanism comprises a rotor assembly.

In a fourth example, the baler may include a first rail and a second rail coupled to the frame and being arranged substantially transverse to the material flow path, wherein the floor assembly and knife system are movably coupled to the first and second rails. In a fifth example, the floor assembly and knife system are slidable along the first rail and second rail between a first position and a second position, the floor assembly and knife system being aligned with the material flow path in the first position, and the floor assembly and knife system being disposed a lateral distance from the material flow path in the second position. In a sixth example, at least one roller may be coupled to the floor assembly or knife system for facilitating movement of the floor assembly and knife system along the first and second rails.

In a seventh example, the knife system may include a first plurality of knives and a second plurality of knives, the first plurality of knives and second plurality of knives being controllably disposed between engaged and disengaged positions. In an eighth example, the baler may include a cab coupled to the frame; a controller for controlling the pivotal movement of the floor assembly about the pivot; and a control mechanism disposed in the cab and electrically coupled to the controller, wherein an actuation of the control mechanism induces the controller to pivot the floor assembly about the pivot between the raised position and the lowered position.

In another embodiment, a baler includes a frame; a pickup mechanism coupled to the frame; a pre-compression chamber coupled to the frame; a flow path defined between at least the pickup mechanism and pre-compression chamber; a rotor assembly positioned along the flow path for transferring crop from the pickup mechanism to the pre-compression chamber; a floor assembly positioned at least partially below the rotor assembly, the floor assembly pivotably coupled to the frame to pivot between a raised position and a lowered position; a knife system coupled to the floor assembly, the knife system including one or more knives at least partially oriented along the flow path; a first rail and a second rail coupled to the frame and being arranged substantially transverse to the flow path; wherein, the floor assembly and knife system are movably coupled to the first and second rails to move between a first position and a second position, the floor assembly and knife system being disposed along the flow path in the first position, and the floor assembly and knife system being spaced a lateral distance from the flow path in the second position.

In one example of this embodiment, the pivot is located rearward of the pickup mechanism and rotor assembly such that the floor assembly and knife system pivot from the raised position to the lowered position in a direction downwardly and towards a rear of the baler. In a second example, at least one roller is coupled to the floor assembly or knife system for facilitating movement of the floor assembly and knife system along the first and second rails. In a third example, the knife system includes a first plurality of knives and a second plurality of knives, the first plurality of knives and second plurality of knives being controllably disposed between engaged and disengaged positions. In a fourth example, the knife system may include a first pair of actuators having at least one end coupled to a first shaft; and a second pair of actuators having at least one end coupled to a second shaft; wherein, the first plurality of knives are coupled to the first shaft and the second plurality of knives are coupled to the second shaft.

In a fifth example, the first pair of actuators are controllably actuated to pivot the first shaft for moving the first plurality of knives between the engaged and disengaged positions; and the second pair of actuators are controllably actuated to pivot the second shaft for moving the second plurality of knives between the engaged and disengaged positions. In a sixth example, the baler may include at least one actuator for controllably pivoting the floor assembly about the pivot, the actuator having a first end and a second end, wherein the first end is coupled to the floor assembly and the second end is coupled to the frame.

In a different embodiment, a baler includes a frame having a first end and a second end, the second end being rearward of the first end; a first feeder assembly coupled to the frame and disposed towards the first end; a second feeder assembly coupled to the frame, the second feeder assembly being disposed rearward of the first feeder assembly; a material flow path defined at least between the first and second feeder assemblies; a first floor assembly positioned at a lower portion of the material flow path; a knife system coupled to the floor assembly, the knife system including one or more knives oriented, at least in part, along the material flow path; and a feeder fork system coupled to the frame and disposed rearward of the floor assembly, the feeder fork system including a second floor assembly coupled to the first floor assembly; wherein, the second floor assembly is pivotably coupled to the frame about a pivot to move at least the first and second floor assemblies between a raised position and a lowered position.

In one example of this embodiment, the pivot is located rearward of the first floor assembly and the second floor assembly such that at least the first floor assembly and the second floor assembly are pivotable from the raised position to the lowered position in a direction downwardly and towards a rear of the baler. In a second example, the knife system is coupled to the first floor assembly. In a third example, the first floor assembly and the second floor assembly are coupled to one another to form a substantially continuous floor structure. In a fourth example, the baler may include a first rail and a second rail coupled to the frame and being arranged substantially transverse to the material flow path, wherein the first floor assembly and knife system are movably coupled to the first and second rails. In a fifth example, the first floor assembly and knife system are slidable along the first rail and second rail between a first position and a second position, the first floor assembly and knife system being positioned along the material flow path in the first position, and the first floor assembly and knife system being spaced a lateral distance from the material flow path in the second position. In a sixth example, the first floor assembly and knife system are movable along the first and second rails independently of the second floor assembly.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
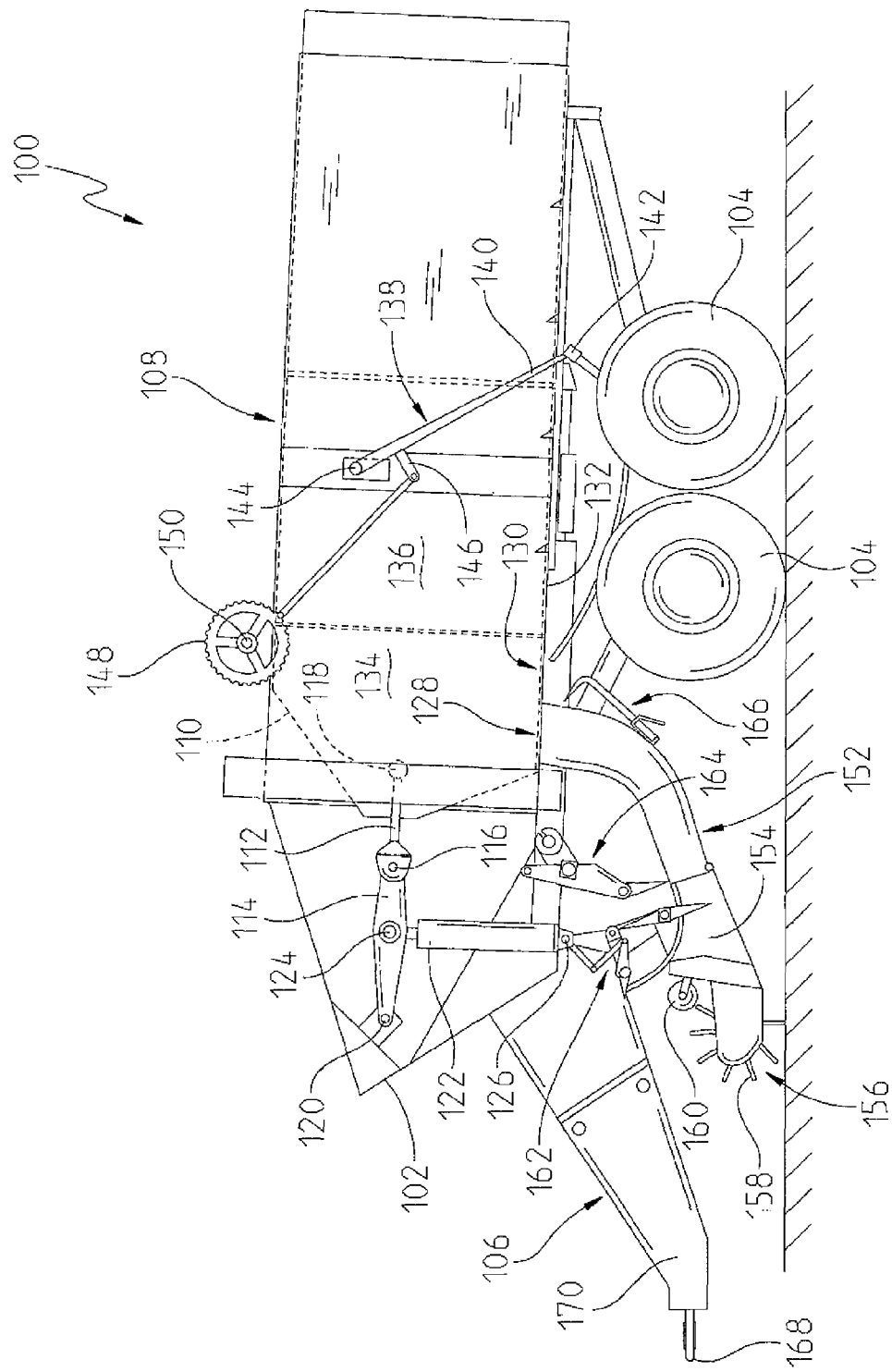
FIG. 1 is an elevational plan view of a baler.

Referring now to FIG. 1, a square baler 100 includes a main frame 102 supported on wheels 104 for being towed over the ground by a tractor (not shown) coupled to a forward end of a draft tongue 106, which is fixed to a forward end of the frame 102. A longitudinally extending baling chamber 108, of rectangular or square cross-section, is supported centrally on the frame 102 at an elevation above the sets of wheels 104.

A plunger head 110 is mounted in a forward section of the chamber 108 for being reciprocated through the action of a toggle linkage defined by a pair of transversely spaced first links 112 and a second link or crank arm 114. The links 112 and 114 are pivotally coupled to each other at a pivotal connection 116, with the pair of first links 112 being pivotally coupled to the plunger head 110 at respective pins 118, and with the second link 114 being coupled to the frame 102, as at a pin 120. A hydraulic plunger head drive cylinder 122 is provided for toggling the links 112 and 114, and for this purpose has a rod end coupled, as at a pin 124, to a location of the link 114. The link 114 is between the pivotal connections 120 and 116, and has a rod end coupled to the frame 102, as at pivot pin 126. When the drive cylinder 122 is fully retracted, as shown in FIG. 1, the plunger head 110 is fully extended to the rear, with the pins 118 and 120 being located such that they lie along a longitudinal central axis of the baling chamber 108. Extension of the cylinder 122 will cause the link 114 to be pivoted upwardly about the pin 120 resulting in the plunger head 110 being retracted to the extent that it uncovers a crop material inlet 128 extending entirely across a region located just in front of a stationary knife (not shown) provided across a forward end 130 of a bottom wall or floor 132 of the baling chamber 108.

The baling chamber 108 includes a front section 134 of fixed cross section which is joined to a rear section 136, of variable cross section, having opposite side panels which are respectively mounted for swinging horizontally about vertical hinges (not shown) provided at their forward ends. A twine tying arrangement (not shown) is provided for wrapping and tying multiple loops of twine about a completed bale. A needle yoke arrangement 138, including opposite arms 140, is joined by a cross tube 142. The needle yoke arrangement 138 is mounted for vertical pivotal movement about a horizontal transverse axis defined by pivotal connections 144 that connect respective ends of the arms 140 to opposite side locations of rear regions of the fixed front baling chamber section 134. A plurality of curved, twine delivery needles, equal in number to the knotter drive gears, are respectively fixed to transversely spaced locations of the cross tube 142. A crank arm is provided at each of opposite ends of the knotter shaft and is pivotally connected between each crank arm and a coupler 146 fixed to each needle yoke arm 140, at a location close to the pivotal connection 144, is a connecting rod.

The bale tying cycle is initiated by a bale length sensor arrangement including a toothed metering wheel 148 mounted on a shaft 150 extending horizontally across and being rotatably mounted to the top of the baling chamber 108. The metering wheel 148 has a toothed periphery which extends into the baling chamber 108 and is contacted by a forming bale so as to be rotated as the bale grows in length. The rotation of the metering wheel 148 is sensed and converted into a signal representing bale length, with a control signal being sent to initiate the tying cycle when the forming bale reaches a length corresponding to a desired bale length.

The machine 100 includes a feed duct or chute 152 having an open forward end section 154, disposed for receiving crop from a pick-up arrangement 156. The chute 152 is curved upwardly and rearwardly from the forward end section to a near vertical rear end located for delivering crop through the baling chamber inlet 128. The pick-up arrangement 156 includes a rotary tine pick-up 158, including a drive rotor or shaft, and a pair of stub augers 160 following the pick-up 158 for centering crop to the width of the baling chamber 108. The duct or chute 152 defines a chamber into which crop material delivered by the pick-up arrangement 156 is fed by a packer fork arrangement 162. Upon the material being compressed to a pre-selected density within the pre-charge chamber, a stuffer arrangement 164 engages a pre-compressed charge of crop material, sometimes called a flake or slice, and sweeps it from the pre-charge chamber and into the baling chamber 108, by way of the baling chamber inlet 128.

A retaining fork arrangement 166 includes a plurality of transversely spaced, hook-shaped retainer tines fixed at transversely spaced locations along a shaft of the arrangement 166. A density sensor, not shown, determines the density of the compressed crop. Once the compressed crop is determined to have a sufficient density, the retaining fork arrangement 166 moves from a retaining position to a release position, which allows the bale being formed and to move toward the rear section 136.

The draft tongue 106 includes a drive connector 168 which is configured to drive the above described systems and subsytems for forming bales, tying bales, and moving the formed bales into and out of the baling chamber 108. The draft tongue 106 includes a removable housing 170 which provides a cover for a drive system 100.

Figure 2:
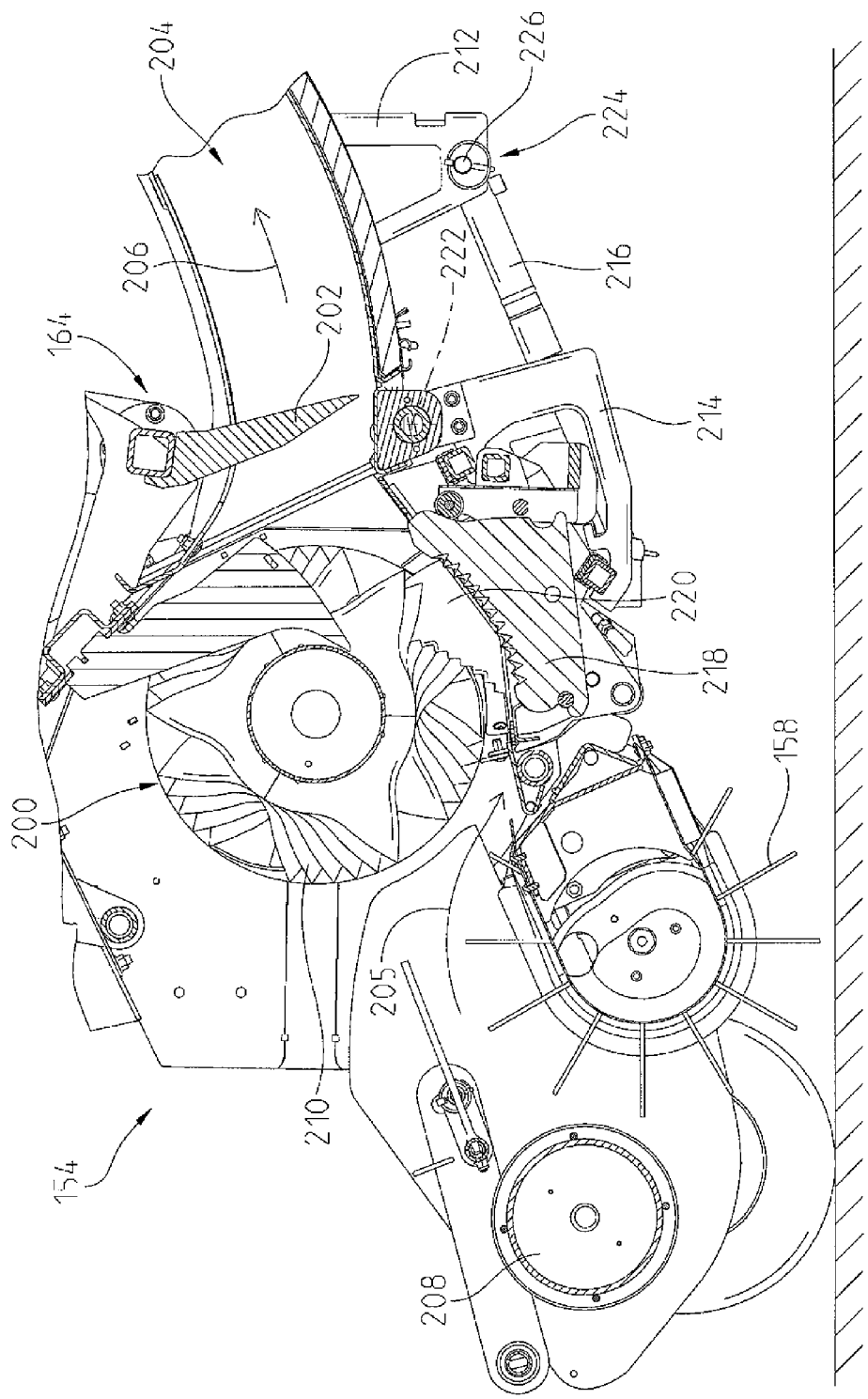
FIG. 2 is partial cross-sectional perspective view of a pickup mechanism and a rotor floor assembly in a closed position.

Referring to FIG. 2, a forward end section 154 of a feeder system is shown in greater detail. As previously described, the baler 100 may include a first or primary feeder system in the form of at least the pickup mechanism 158 and a baffle mechanism 208. The baffle mechanism 208 is designed to assist with maintaining a rearward crop flow path (e.g., see arrow 206 pointing in a rearward direction) and directing the crop towards the pickup mechanism 158. As shown, the pickup mechanism 158 can include a plurality of tines or teeth for collecting crop from a ground surface and feeding the collected crop to a secondary feeder system.

The secondary feeder system may include a rotor assembly 200 that includes a plurality of teeth or tines 210. The pickup mechanism 158 can pick up or collect the crop as the baler 100 moves in a forward direction and the crop is then transferred rearward by the rotor assembly 200. As the crop moves rearward, one or more feeder forks 202 of the secondary feeder system can further transfer the crop into the pre-compression chamber 204 along a flow path 206. Each feeder fork 202 may travel along two paths in the pre-compression chamber 204, i.e., a "filling stroke path" and a "return stroke path".

The pre-compression chamber 204 is designed to build a substantially square-shaped flake of crop. The flake of crop continues to build as described above until it is moved out of the pre-compression chamber and into a baling chamber 108. Once formed, the square bale may be extruded out of the back or rear of the baler 100.

In the embodiment of FIG. 2, the secondary feeder system may also include a knife system. The knife system may include a plurality of knives to cut the crop passing into and through the rotor assembly 200. The plurality of knives are substantially stationary, but may be moved between an engaged position 220 and a disengaged position 218. In one example, a first plurality of knives is in the engaged position 220 and a second plurality of knives is in the disengaged position 218. Each of the plurality of knives in the engaged position 220 may include a plurality of teeth 306 (FIG. 3) for cutting crop, whereas the plurality of knives in the disengaged position 218 may also include a plurality of teeth 304. The baler 100 may include a cab (not shown) that has controls (not shown) for controlling the operation of the baler 100. One or more of these controls (not shown) can trigger the plurality of knives between the engaged and disengaged positions. During operation, engaged knives 220 may be disposed between the teeth 210 of the rotor assembly 200 to cut the crop into smaller portions. The knife system will be described in further detail below.

Figure 4:
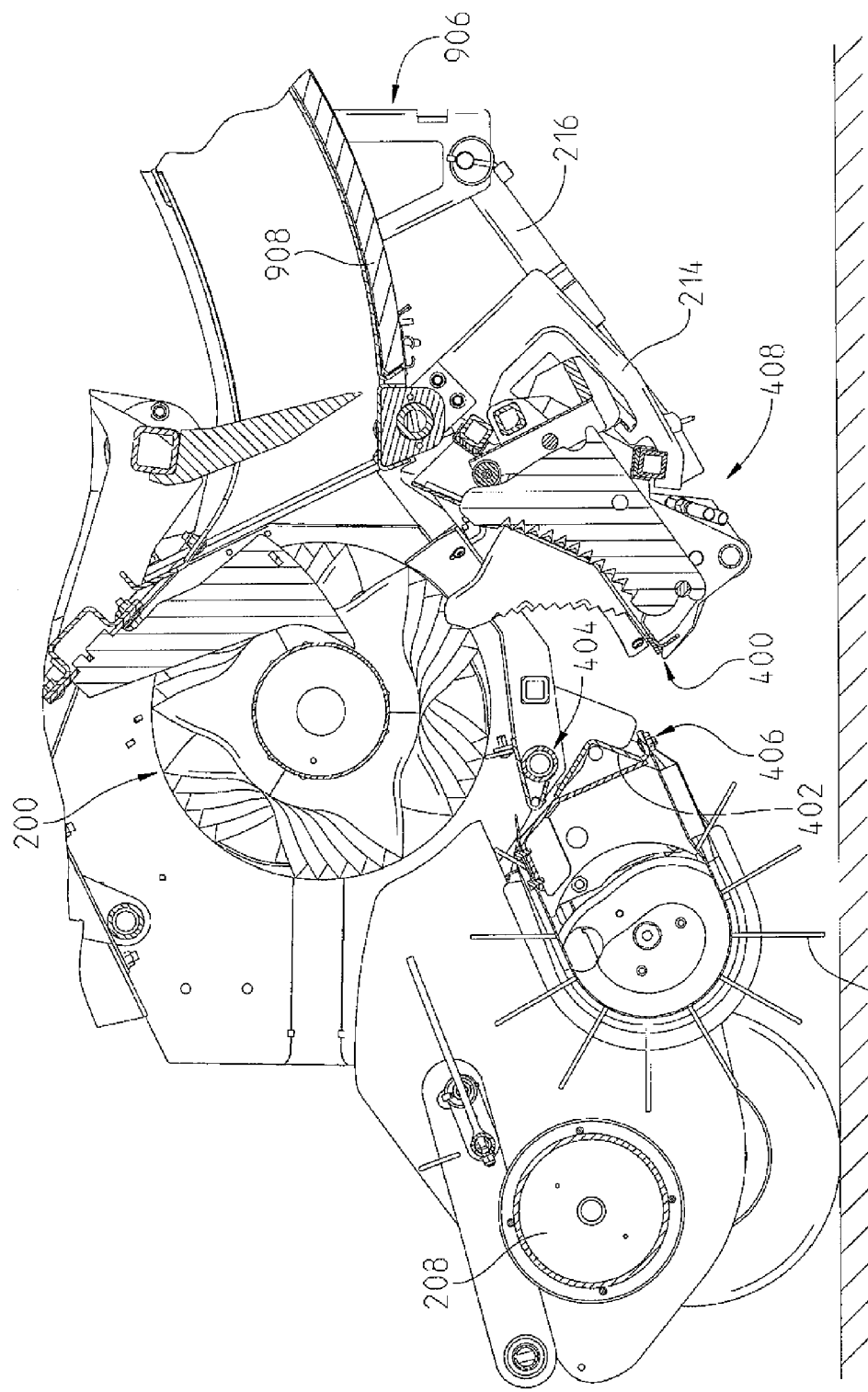
FIG. 4 is a partial cross-sectional perspective view of the pickup mechanism and the floor assembly in an open position.

The secondary feeder system may also include a movable rotor floor assembly 214. As shown in FIG. 2, the floor assembly 214 may be disposed at least partially below the rotor assembly 200 and rearward of the pickup mechanism 158. The knife system may be coupled or mounted to the floor assembly 214. The floor assembly 214 may be pivotally coupled at a pivot location 222 to the pre-compression chamber 108. The pre-compression chamber 108 is a stationary structure that is coupled to the baler main frame 102. An actuator 216 may be coupled at one end to the floor assembly 214 and at an opposite end thereof to a frame member 212. The opposite end of the actuator 216 may be coupled to the frame member 212 via a pin 226 or similar coupling mechanism which allows the actuator 216 to pivot with respect to the frame member 212 about a second pivot location 224. The frame member 212 may form part of the main frame 102 or the pre-compression chamber 108. In any event, the actuator 216 may include a cylinder and rod that controllably pivots the floor assembly 214 about the pivot location 222 between a raised position (FIG. 2) and a lowered position (FIG. 4). The actuator 216 may be any known actuator that is controlled hydraulically, electrically, mechanically, electro-mechanically, etc.

Similar to the knife system described above, the actuator 216 may be controlled via controls in the cab (not known) of the baler 100. Thus, an operator of the baler may control the engagement or disengagement of the plurality of knives and movement of the floor assembly 214 between the raised and lowered positions. Since the knife system is coupled to the floor assembly 214, the knife system also moves with the floor assembly 214 between the raised and lowered positions.

Referring to FIGS. 2 and 4, the floor assembly 214 is designed to pivot about the rear pivot location 222. As such, the floor assembly 214 and knife system may be lowered rearwardly about the pivot location 222 via the actuator 216. The pivoting of the floor assembly 214 and knife system provides a number of advantages. First, it allows for crop to be easily unplugged between the rotor assembly 200 and floor assembly 214 directly from the cab rather than requiring manual unplugging. During baler operation, crop is collected by the pickup mechanism 158 and directed towards the rotor assembly 200. If too much crop builds between the pickup mechanism 158 and the rotor assembly 200, a torque limit or threshold of the rotor assembly 200 may be exceeded and a "plug" of crop may develop under the rotor assembly 200. The rotor assembly 200 may be disabled once the torque limit is exceeded.

As shown in FIG. 4, the pickup mechanism 158 can include a frame 402. In addition, adjacent to or above the frame 402 is a cross support 404 that is fixed and provides support to an auger housing. In the raised position of FIG. 2, the floor assembly 214 includes an upper, front lip 400 that is in close proximity to the cross support 404. During operation, the location at which the lip 400 and cross support 404 are in close proximity to one another forms the plug location, i.e., where the crop is being forced downwardly and rearwardly by the rotor assembly 200. The plug location becomes the location where the crop is being forced to change directions from a downward direction (e.g., towards the ground) to a rearward direction.

When the crop becomes plugged between the front lip 400 of the floor assembly 214 and the cross support 404, it is desirable to loosen the plug to reduce the torque. To do so, most conventional balers either move the floor assembly towards the front of the baler or the floor assembly is stationary. In some instances, conventional balers may require the operator to manually unplug the crop because there is a lack of movement of the floor assembly. In any event, most conventional balers are not designed to relieve the "plugged" crop.

With the rearward pivoting floor assembly 214 disclosed herein, however, the crop can be easily unplugged by pivoting the floor assembly 214 about its rear pivot location 222 to a lowered position 408. As the floor assembly 214 is pivoted to its lowered position, the plug may be relieved so that the rotor assembly 200 may be re-engaged or enabled. Since the floor assembly 214 may be actuated from the cab, an operator is not required to manually unplug the crop.

Figure 5:
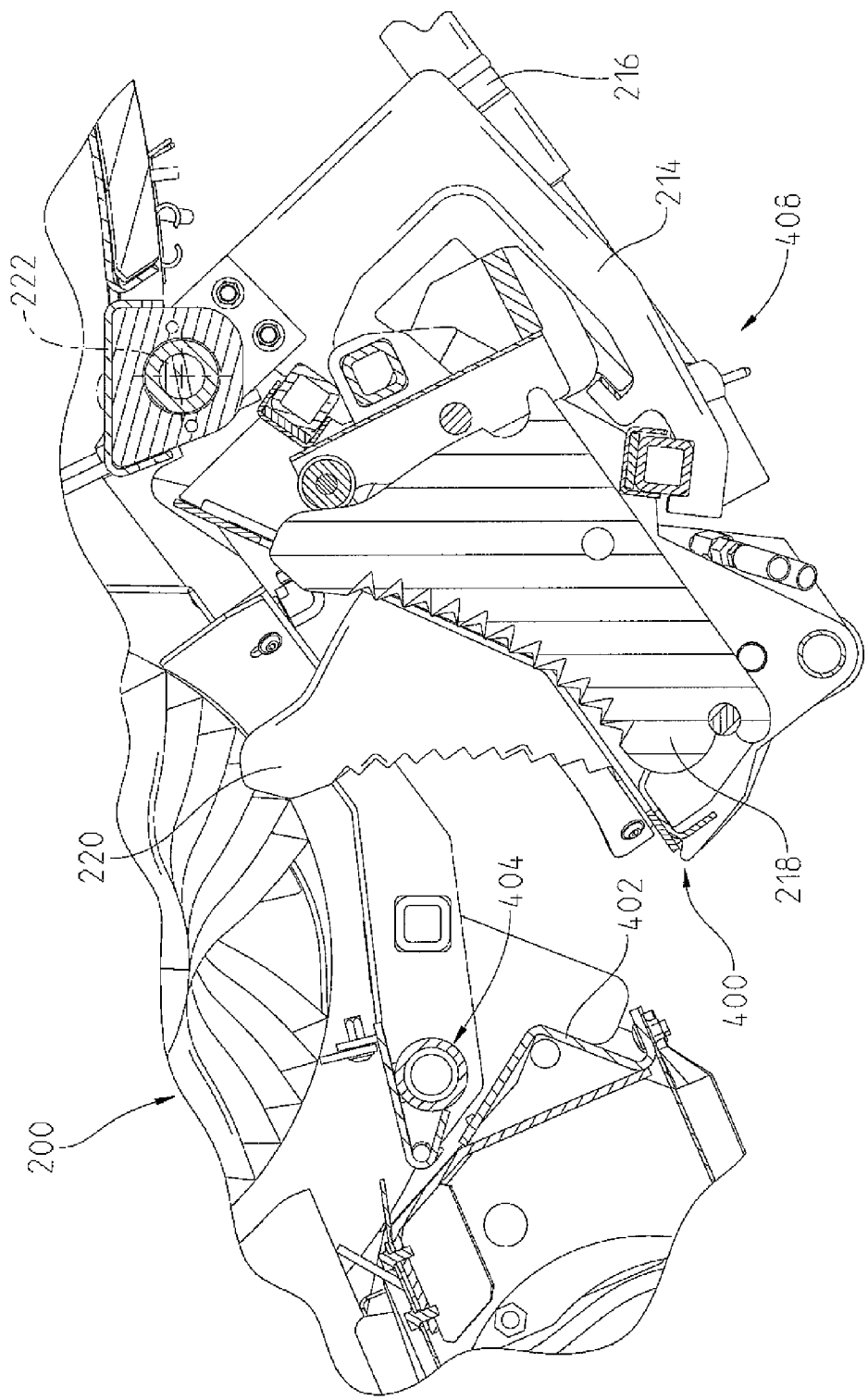
FIG. 5 is a partial cross-sectional view of the floor assembly of FIG. 4.
Figure 13:
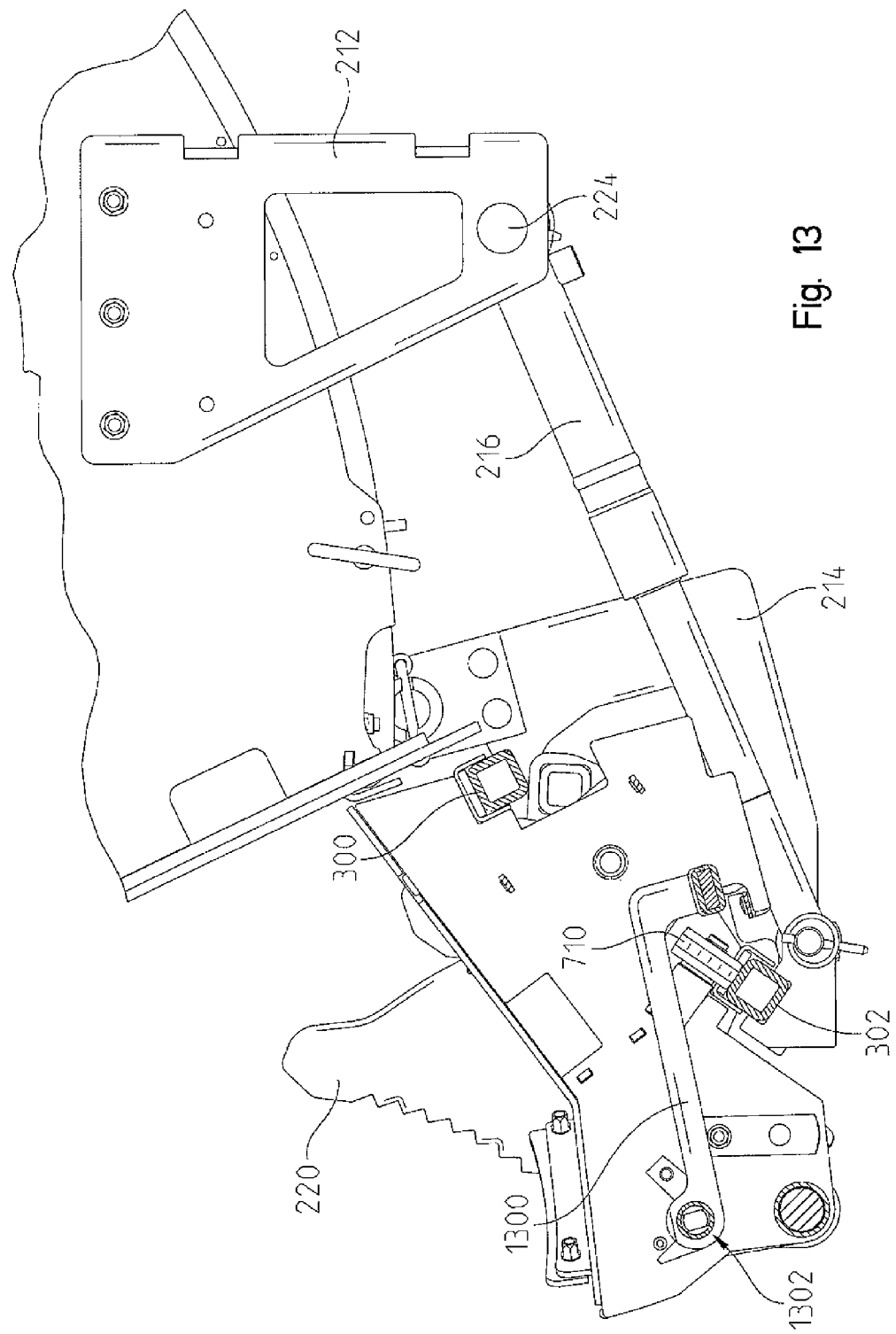
FIG. 13 is a partial cross-sectional side perspective view of a floor assembly and de-coupling mechanism for the knife system of FIG. 8.

In FIGS. 4 and 5, location 406 on the pickup mechanism frame 402 is often the lowest point on conventional balers, but as clearly shown in FIG. 4 the articulation or pivoting of the floor assembly 214 in the present embodiment positions the floor assembly 214 at a location below this point 406. This provides another advantage to the rear pivoting floor assembly 214. Here, since the knife system is coupled to and moves with the floor assembly 214, the knife system can be more easily serviced in the lowered position 408. When baling, the engaged and disengaged knives are stationary. The engaged knives are subject to wear over time. Referring to FIG. 13, there may be a handle or lever 1300 to release or unlock a locking mechanism 1302 so that the knives can be easily accessed for service. One or more of these features, including spring 814 (FIG. 8), may also provide overload relief to the knife system. Thus, if a rock enters the area of the rotor assembly 200, one or more of the knives may compress the spring 814 so that it moves out of the way of the rock at least temporarily. The spring 814 is biased in tension so that the knives are spring-loaded towards the engaged position 220. The spring 814 therefore will uncompress to move the knives towards their original position.

The ability to move the floor assembly 214 and knife system downwardly and rearwardly thus improves the accessibility of the knives for servicing and facilitates a novel unplugging feature not found on most conventional balers. In one non-limiting example, the combined floor assembly 214 and knife system can pivot about rear pivot 222 by approximately 15°. In another example, the combination may pivot approximately 20°. In any event, the rear pivot location allows the floor assembly 214 and knife system to pivot to a lowered position 408 that provides better accessibility for servicing the knife system and unplugging crop than conventional balers. In addition, by pivoting from the rear pivot point 222, the pickup mechanism 158 and rotor assembly 200 are not obstacles to accessing and servicing the knife system. Moreover, the engaged knives of the knife system remain in the engaged position 218 even as the combination moves to the lowered position 408.

Figure 3:
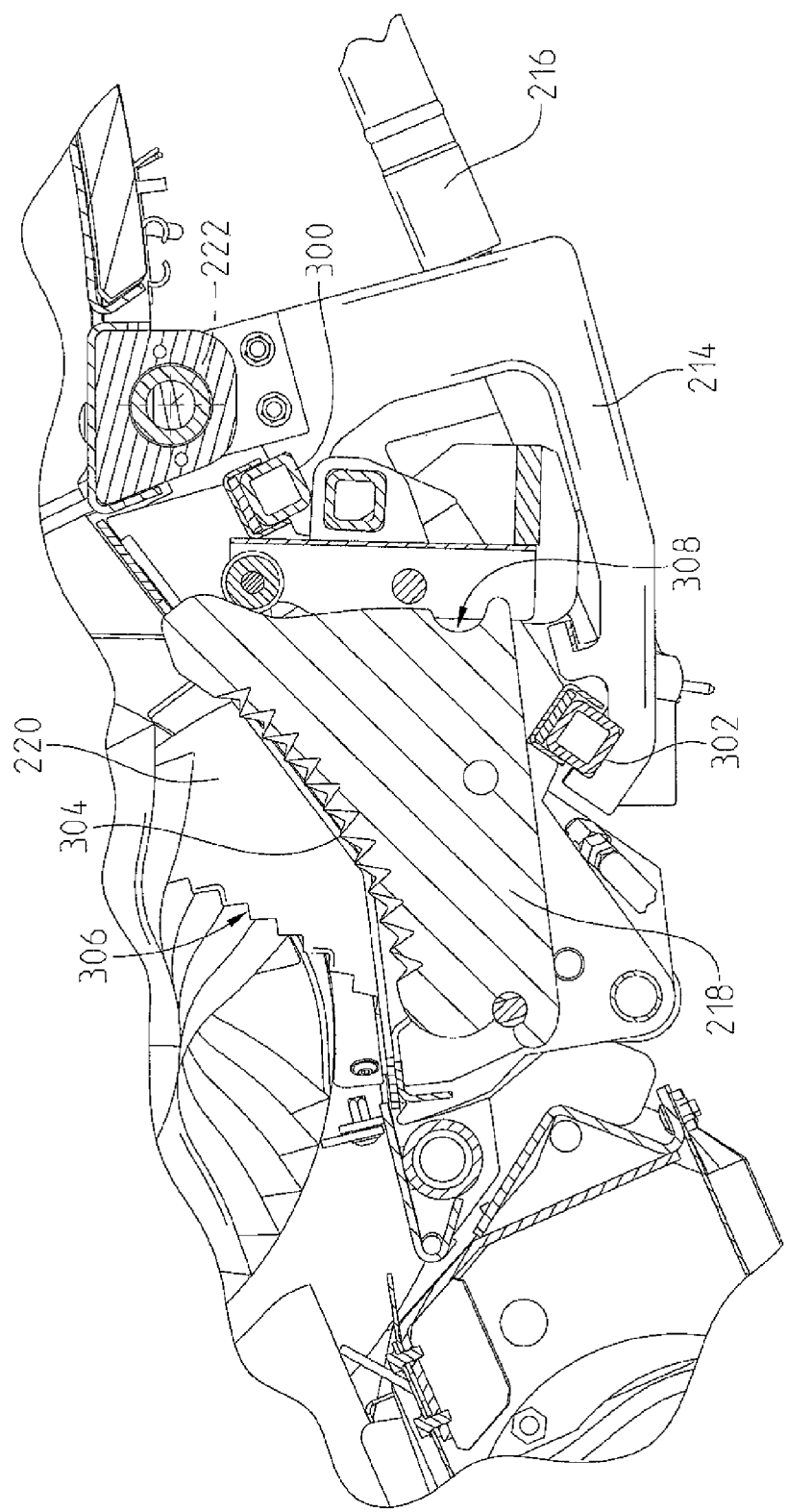
FIG. 3 is a partial cross-sectional view of the floor assembly of FIG. 2.
Figure 6:
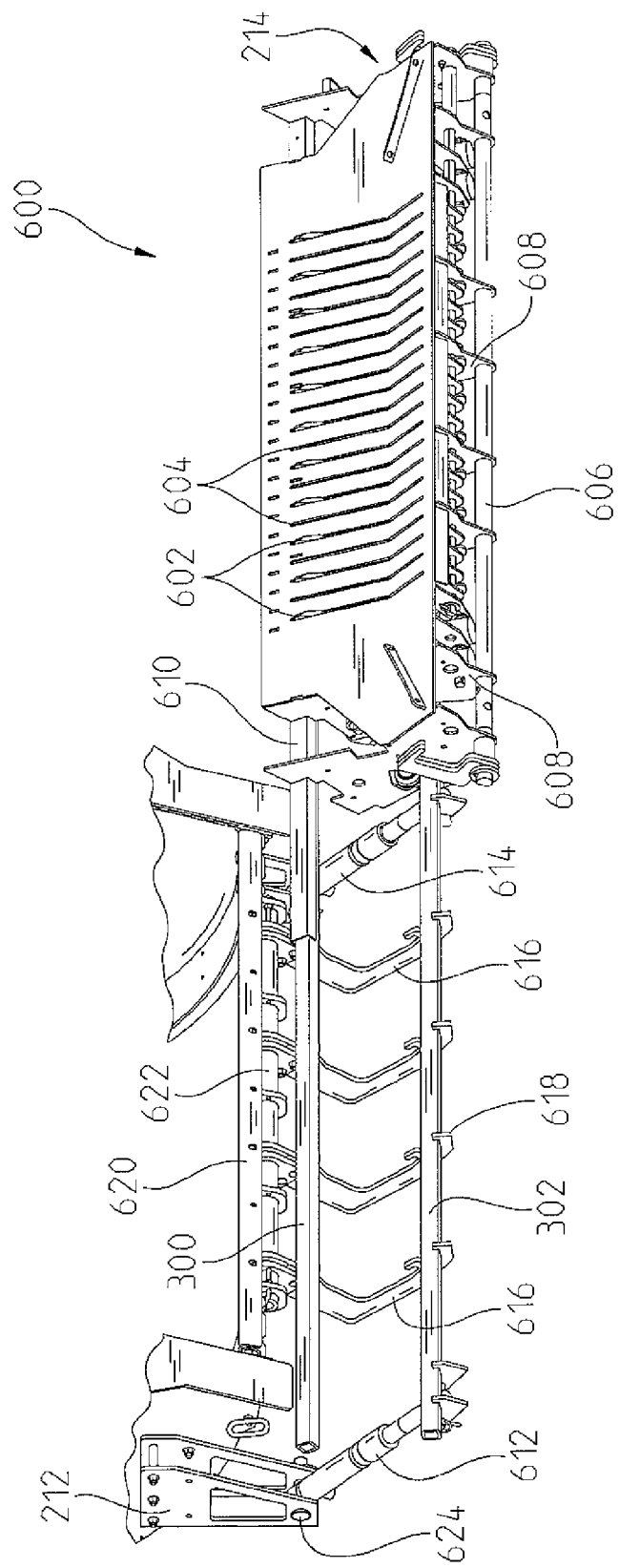
FIG. 6 is a front perspective view of the floor assembly in a laterally-disposed position.

Referring to FIGS. 3 and 6-8, another embodiment of the movable floor assembly 214 and knife system is illustrated. In this embodiment, the floor assembly 214 and knife system are capable of being articulated or moved laterally about a pair of tubes or rails. In FIGS. 3 and 6, for example, the floor assembly 214 can include a first or upper rail 300 and a second or lower rail 302. The first and second rails are substantially transverse to a crop flow path defined between the pickup mechanism 158 and pre-compression chamber 204 (e.g., the flow path is at least partially defined along directions 205 and 206 of FIG. 2). The floor assembly 214 can further include a first sleeve member 610 and a second sleeve member 704 that slide along the first rail 300 and second rail 302, respectively, so that the floor assembly 214 and knife system can be disposed in a slideout position 600. Rollers 710 may be coupled to the floor assembly 214 to permit lateral movement of the floor assembly 214 and knife system from its position in FIG. 3 to its slideout position 600 of FIG. 6.

Figure 7:
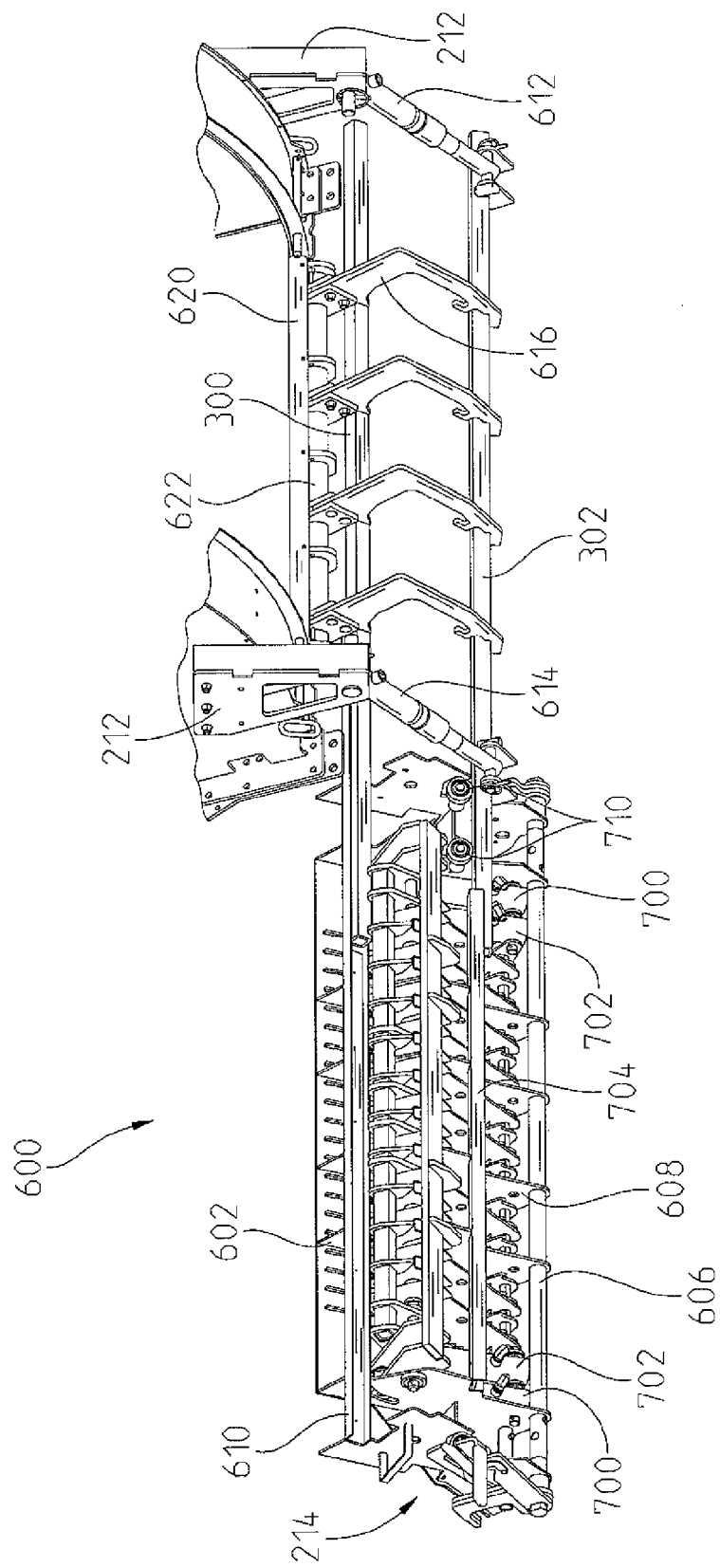
FIG. 7 is a rear perspective view of the floor assembly in the position of FIG. 6.

As shown in FIGS. 6 and 7, the actuator 216 of the previously described embodiment may actually include or be replaced by a first actuator 612 and a second actuator 614. Both actuators may be coupled to the frame member 212 as previously described and pivot about a pivot location 624. The actuators may be further coupled to a pivoting mechanism formed by a plurality of arms 616, a cross member 620, and a lateral support 622. The plurality of arms 616 may be coupled (e.g., welded) via holding members 618 to the first rail 300 and second rail 302, and thus remain substantially stationary. In other words, the pivoting mechanism does not move or slide laterally with the floor assembly 214 and knife system.

Figure 8:
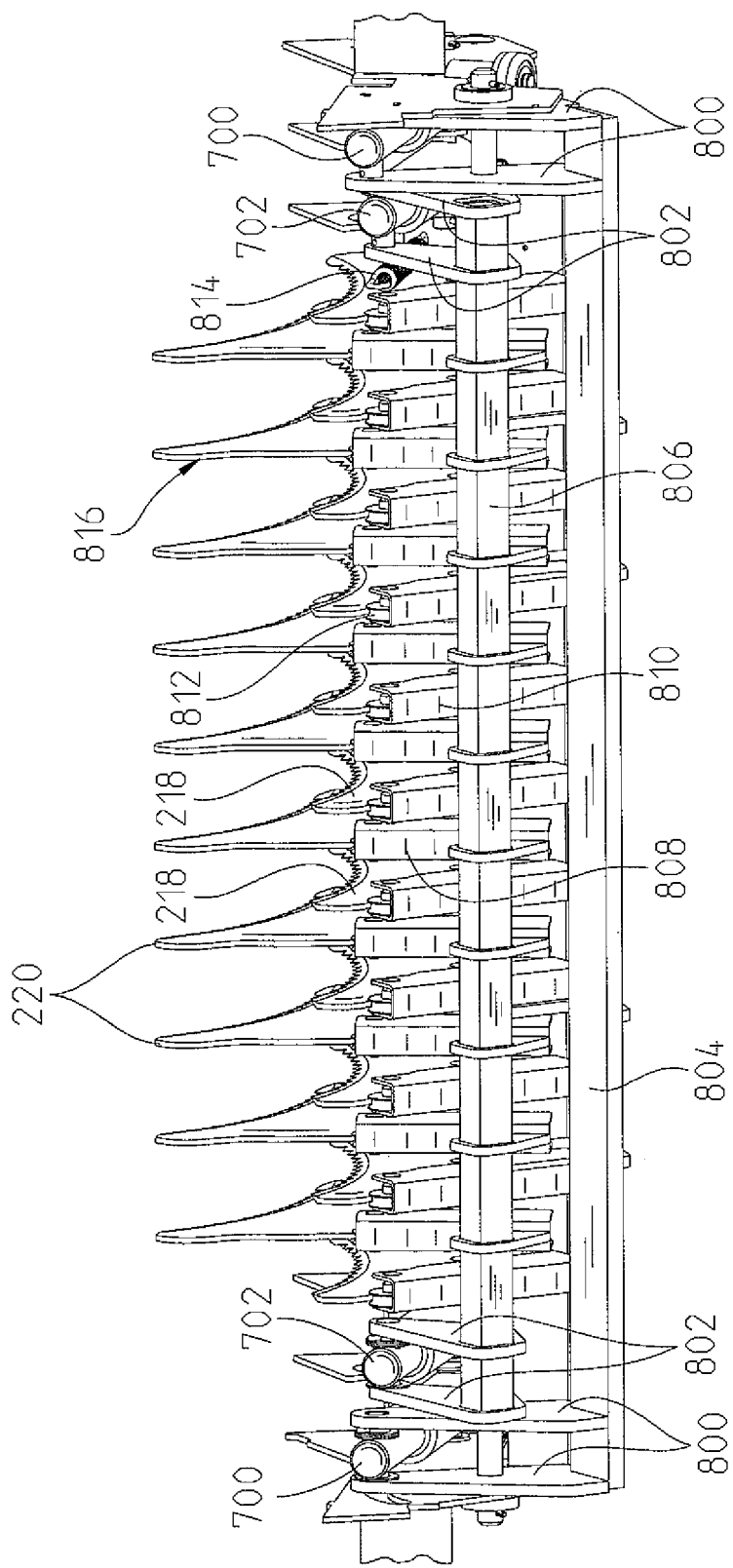
FIG. 8 is a rear perspective view of a knife system.

As best shown in FIGS. 6-8, the knife system may include a first plurality of knives 602 disposed in an engaged position 218 and a second plurality of knives 604 disposed in a disengaged position 220. In one example, the number of knives in the first plurality of knives 602 may be the same as the number of knives in the second plurality of knives 604. In another example, the number of knives may differ between the two sets of knives.

In any event, the knife system may further include a support frame 608 and one or more support members 606. The first plurality of knives 602 may be controllably moved between the engaged and disengaged positions by a first or inner pair of actuators 702. The second plurality of knives 604 may be controllably moved between the engaged and disengaged positions by a second or outer pair of actuators 700. As previously described, the actuators 700, 702 may be controlled via one or more controls in the cab of the baler. Thus, an operator may alternatively trigger the knives between their engaged and disengaged positions.

The knives in the knife system are configured to pivot about a shaft. The first plurality of knives 602 may pivot about a first shaft 806 and the second plurality of knives 604 may pivot about a second shaft (not shown). The knife system may include one or more support or frame members, such as support plates 800, 802 and support members 804. First support plates 800 can be coupled to the outer actuators or cylinders 700, and the second support plates 802 can be coupled to the inner actuators or cylinders 702.

The first plurality of knives 602 may be held or coupled to a first holding mechanism 808 and the second plurality of knives 604 may be held or coupled to a second holding mechanism 810. A roller 812 may be coupled to each holding mechanism and may be moved upwardly or downwardly via a lever to engage or disengage the respective knife. For instance, each knife may include a recess or cutout portion 308 formed in its rear surface 816 as best shown in FIG. 3. The roller 812 can be disposed in the cutout portion 308 when it is in its engaged position. The inner or outer cylinder however can move the roller into or out of the cutout portion 308 depending on whether the knife is to be engaged or disengaged. This can be further controlled by the operator in the cab as previously described.

Figure 9:
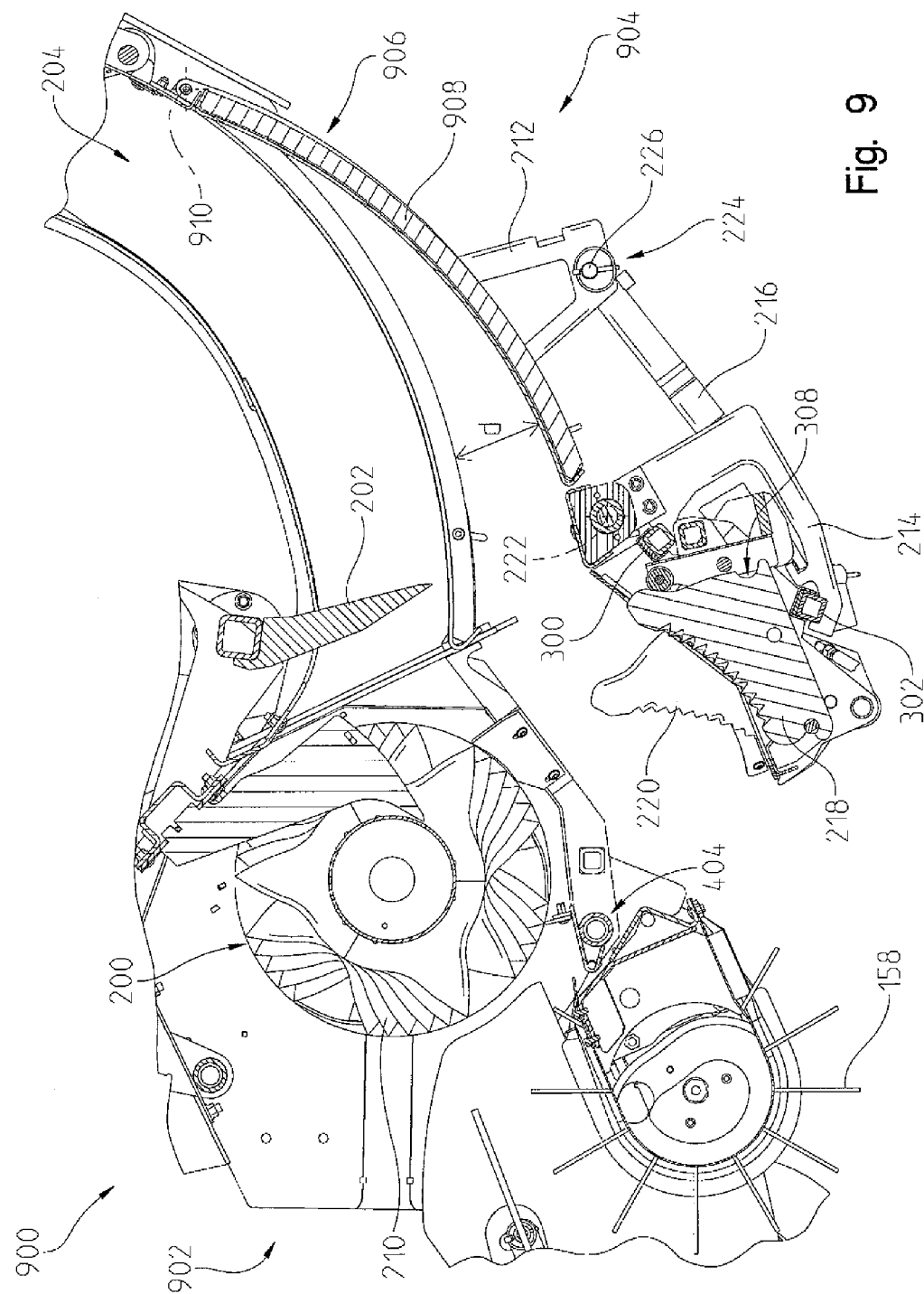
FIG. 9 is a partial cross-sectional side perspective view of a floor assembly and feeder fork assembly in a lowered position.

The ability to slide or move the floor assembly 214 and knife system laterally to the slideout position 600 of FIG. 6 can provide better accessibility to service the knives. Another embodiment that provides improved unplugging of crop and serviceability is shown in the embodiment of FIG. 9. In FIG. 9, an alternative feeder system 900 of a baler is shown where the floor assembly 214 and knife system can be pivoted about a different rear pivot 910 that also allows for a concomitant pivotal movement of a floor 908 of the feeder fork system 906. In FIG. 9, a front end of the baler is referenced as 902 and a rear end of the baler is referenced as 904. As shown, the rear pivot 910 of this embodiment is further rearward than the original rear pivot 222 of the previously described embodiments. Moreover, an actuator (not shown) similar to the actuator 216 of FIG. 2 may be controlled to move the floor assembly 214, knife system, and floor 908 between a raised position and a lowered position (FIG. 9). The actuator may be controlled from the cab of the baler hydraulically, electrically, mechanically, electro-mechanically, or any other known way.

In FIG. 9, the actuator can lower the combined floor assembly 214, knife system, and floor 908 by a distance "d" and at an angle Θ. The distance "d" and angle Θ may be any desirable distance or angle that promotes serviceability of the knife system and unplugging of crop. In one non-limiting example, distance "d" may be at least five (5) inches and the angle Θ may be at least 15°. In one aspect, the distance "d" that the aforementioned combination is lowered in the embodiment of FIG. 9 may be less than the distance that the combined floor assembly 214 and knife system is lowered in the previous embodiment of FIG. 2. This smaller distance "d" may be at least attributed to positioning the rear pivot location 910 further towards the rear 904 of the baler compared to pivot location 222. Thus, it is also possible in the embodiment of FIG. 2 for additional support structure to be added above, below, or outward from the pre-compression chamber 204 for locating pivot location 222 more rearward from its location shown in FIG. 2. This would allow for the floor assembly 214 and knife system to be lowered a smaller distance than shown in the lowered position 408 of FIG. 4.

The floor assembly 214, knife system, and floor 908 may be lowered as shown so that crop may be unplugged from the rotor assembly 200 or feeder fork system 906 similar to that previously described. Moreover, in this embodiment, a substantially continuous "floor" is established between the rotor assembly 200 and feeder fork system 906. This can advantageously reduce or eliminate the need to feed crop over a gap or space that otherwise exists between the floor assembly 214 and knife system in the lowered position 408 and the feeder fork system 906. In FIG. 4, for example, a gap or space is formed between the rotor assembly 200 and the floor 908 of the feeder fork system 906, and in some cases, a small quantity of crop may fall through this gap or space. In the embodiment of FIG. 9, however, this is avoided by providing the continuous "floor". In addition, there may be ribs or other structure (not shown) between the rear pivot location 910 and floor assembly 214 to provide additional support to the overall structure for handling various crop loads.

Figure 10:
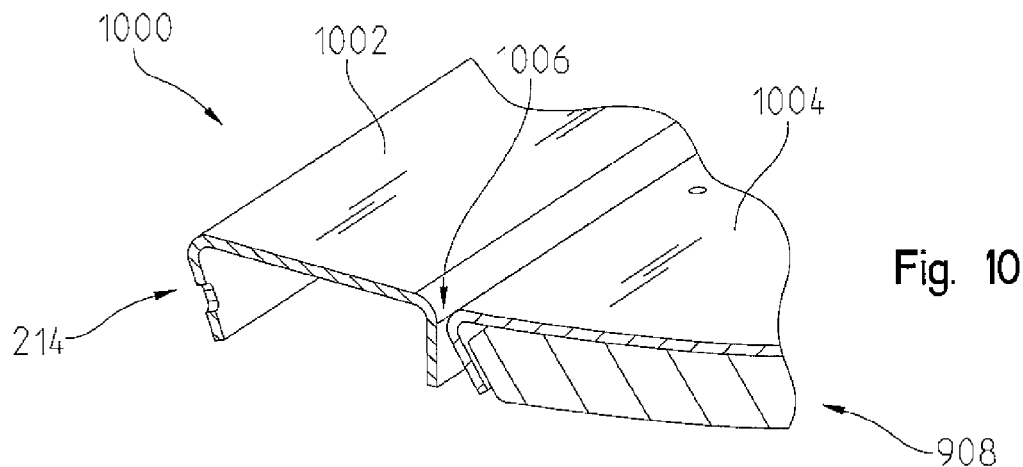
FIGS. 10-12 are partial cross-sectional perspective views of different embodiments of the floor assembly and feeder fork assembly of FIG. 9.
Figure 11:
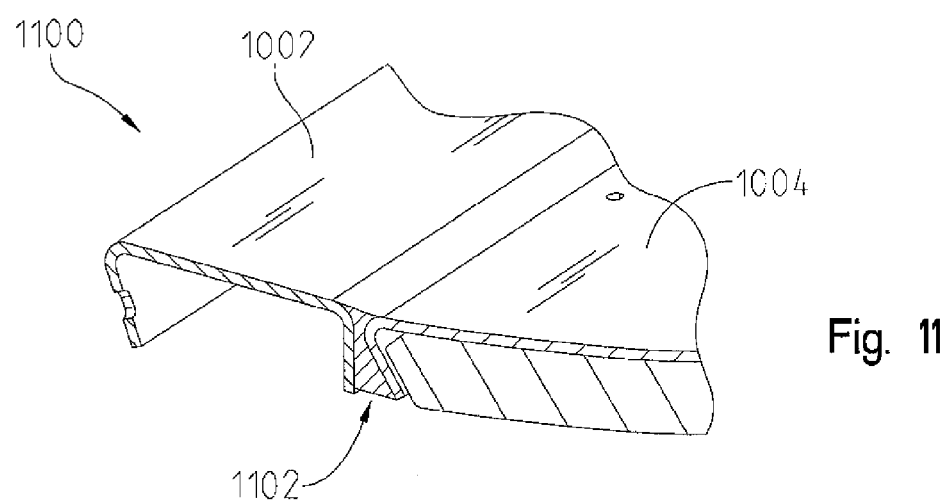
Figure 12:
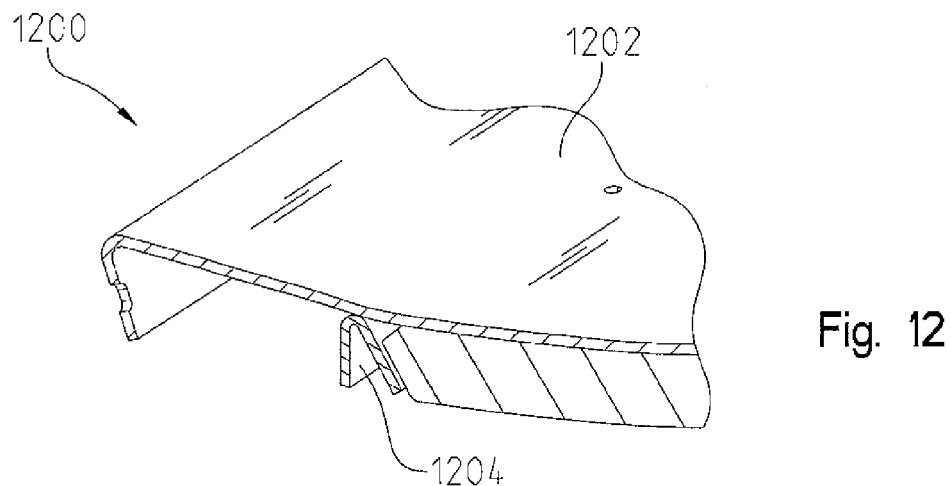

Referring to FIGS. 10-12, portions of the floor assembly 214 and floor 908 of the feeder fork system 906 are shown. In the embodiment 1000 of FIG. 10, a portion 1002 of the floor assembly 214 is disposed adjacent to a portion 1004 of the floor 908. In the embodiment shown in FIG. 2, a gap or space 1006 may be defined between the two portions 1002, 1004. The two portions 1002, 1004 may be positioned in close proximity to one another so that this gap or space is minimized.

Alternatively, the floor assembly 214 and floor 908 may form a continuous structure. In FIG. 11, an embodiment 1100 is shown where material 1102 may be filled inbetween the two portions 1002, 1004 to provide a continuous floor. For example, an adhesive or weld may be used to couple the two portions together. In FIG. 12, a further embodiment 1200 represents a single, continuous plate 1202 that forms an upper surface on both the floor assembly 214 and floor 908. Vertical ribs or supports 1204 may be used to bolster the floor assembly 214 and floor 908 to one another.

In the embodiment of FIG. 9, it may also be possible for the floor assembly 214 and knife system to slide laterally along the first rail 300 and second rail 302 to a position similar to that of FIG. 6. In this manner, the floor 908 of the feeder fork system 906 may also slide out laterally. Alternatively, the floor assembly 214 and knife system may move laterally independently of the floor 908 (e.g., in the embodiment 1000 of FIG. 10 where the floor assembly 214 and floor 908 do not form a continuous floor structure). In any event, the ability to unplug crop between the rotor assembly 200 and floor assembly 214 and improve accessibility to service the knife system are provided in each of the aforementioned embodiments.

Figure 14:
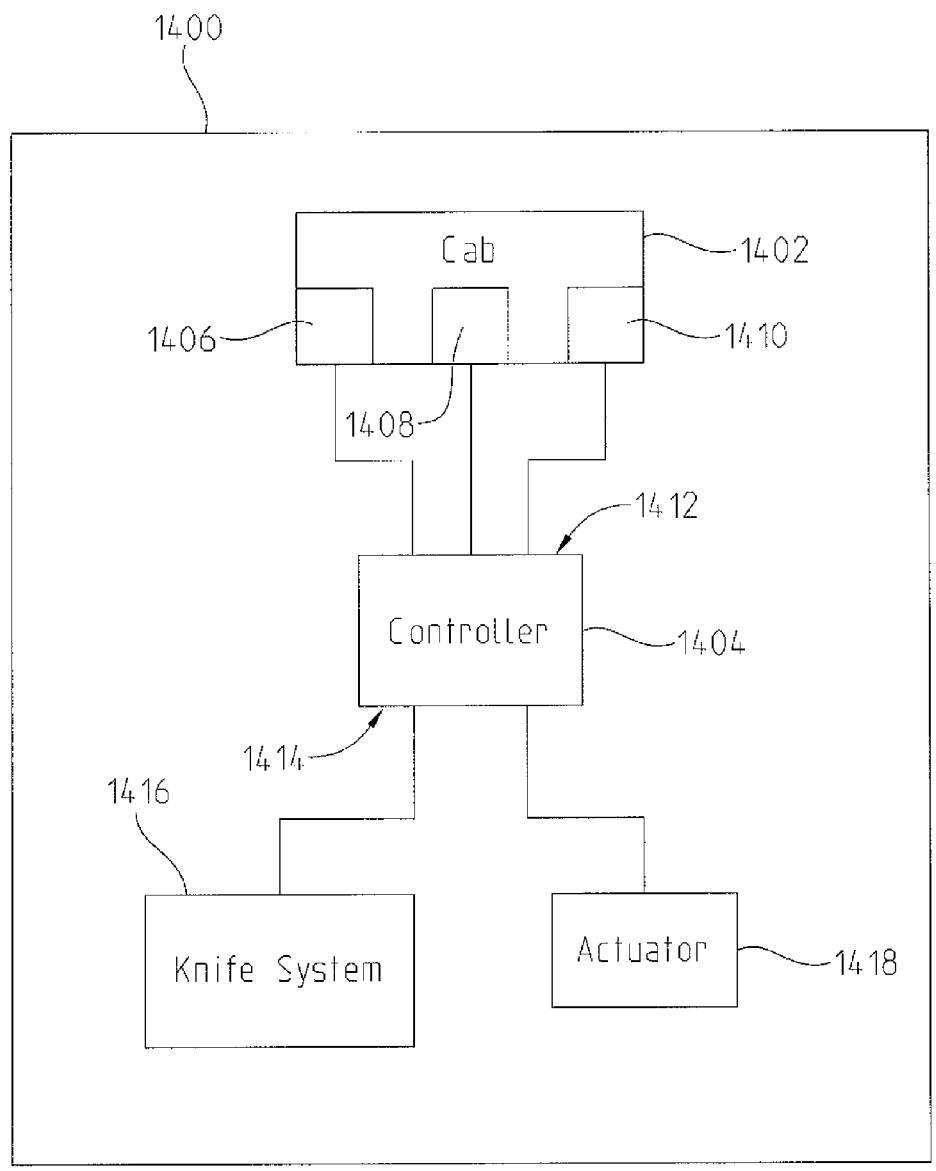
FIG. 14 is a schematic of a control diagram.

Referring now to FIG. 14, the control aspects of this disclosure have been briefly described throughout. In FIG. 14, one example of a control scheme is illustrated. A baler 1400 is shown having a cab 1402 where an operator is positioned during operation. The cab 1402 may include a first control 1406, a second control 1408, and a third control 1410. The cab 1402 may include additional controls, but this embodiment is only intended as a simplified example. Each of the controls may be manually controlled by the operator to control different functions or operations of the baler 1400. Each control may be accessed by the operator inside the cab 1402. Alternatively, one or more controls may be accessed from outside the cab 1402.

Each of the first control 1406, second control 1408, and third control 1408 may be electrically coupled to an input side 1412 of a controller 1404. The controller 1404 may be coupled to the baler 1400 in any conventional manner. The controller 1404 may also include an output side 1414 thereof for transmitting signals to various components or mechanisms to control the operation of the baler 1400. For example, the controller 1404 may output instructions to a knife system 1416 to engage a first plurality of knives 602 (FIG. 6) and disengage a second plurality of knives 604. In another example, the controller 1404 may output instructions to an actuator 1418 for moving the floor assembly 214 between a raised and lowered position. In some embodiments, the lateral movement of the floor assembly 214 may be remotely controlled via one of the controls in the cab 1402 such that the controller 1404 may control the movement of the floor assembly 214 and knife system to and from the slideout position 600. Any one of the first control 1406, second control 1408, and third control 1410 may communicate instructions to the input side 1412 of the controller 1404 to control one of the aforementioned control aspects of the baler 1400.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A baler, comprising:
a frame;
a pickup mechanism coupled to the frame, the pickup mechanism adapted to collect crop;
a pre-compression chamber coupled to the frame rearward of the pickup mechanism;
at least one wheel supporting the frame, the at least one wheel located between the pre-compression chamber and a rear of the baler;
a material flow path defined at least between the pickup mechanism and pre-compression chamber;
a feeder system coupled to the frame along the material flow path and between the pickup mechanism and the pre-compression chamber, the feeder system including:
a feeding mechanism for transferring crop received from the pickup mechanism to the pre-compression chamber;
a floor assembly positioned at least partially below the feeding mechanism, the floor assembly being pivotably coupled to the frame about a pivot to move between a raised position and a lowered position;
a knife system coupled to the floor assembly, the knife system including one or more knives oriented, at least in part, along the material flow path;
wherein, the pivot is located rearward of the pickup mechanism and feeding mechanism such that the floor assembly and knife system pivot from the raised position to the lowered position in a direction downwardly and towards the at least one wheel located between the pre-compression chamber and the rear of the baler.

2. The baler of claim 1, further comprising a plug location disposed along the material flow path and defined between the pickup mechanism and the floor assembly in the raised position, wherein the pivot is located rearward of the plug location.

3. The baler of claim 1, further comprising at least one actuator for controllably pivoting the floor assembly about the pivot, the actuator having a first end and a second end, wherein the first end is coupled to the floor assembly and the second end is coupled to the frame.

4. The baler of claim 1, wherein the feeding mechanism comprises a rotor assembly.

5. The baler of claim 1, further comprising a first rail and a second rail coupled to the frame and being arranged substantially transverse to the material flow path, wherein the floor assembly and knife system are movably coupled to the first and second rails.

6. The baler of claim 5, wherein the floor assembly and knife system are slidable along the first rail and second rail between a first position and a second position, the floor assembly and knife system being aligned with the material flow path in the first position, and the floor assembly and knife system being disposed a lateral distance from the material flow path in the second position.

7. The baler of claim 5, further comprising at least one roller coupled to the floor assembly or knife system for facilitating movement of the floor assembly and knife system along the first and second rails.

8. The baler of claim 1, wherein the knife system comprises a first plurality of knives and a second plurality of knives, the first plurality of knives and second plurality of knives being controllably disposed between engaged and disengaged positions.

9. The baler of claim 1, further comprising:
a cab coupled to the frame;
a controller for controlling the pivotal movement of the floor assembly about the pivot; and
a control mechanism disposed in the cab and electrically coupled to the controller, wherein an actuation of the control mechanism induces the controller to pivot the floor assembly about the pivot between the raised position and the lowered position.

10. A baler, comprising:
a frame;
a pickup mechanism coupled to the frame;
a pre-compression chamber coupled to the frame;
at least one wheel supporting the frame, the at least one wheel located between the pre-compression chamber and a rear of the baler;
a flow path defined between at least the pickup mechanism and pre-compression chamber;
a rotor assembly positioned along the flow path for transferring crop from the pickup mechanism to the pre-compression chamber;
a floor assembly positioned at least partially below the rotor assembly, the floor assembly pivotably coupled to the frame to pivot from a raised position to a lowered position in a direction downwardly and towards the at least one wheel located between the pre-compression chamber and the rear of the baler;
a knife system coupled to the floor assembly, the knife system including one or more knives at least partially oriented along the flow path;
a first rail and a second rail coupled to the frame and being arranged substantially transverse to the flow path;
wherein, the floor assembly and knife system are movably coupled to the first and second rails to move between a first position and a second position, the floor assembly and knife system being disposed along the flow path in the first position, and the floor assembly and knife system being spaced a lateral distance from the flow path in the second position.

11. The baler of claim 10, wherein the pivot is located rearward of the pickup mechanism and rotor assembly such that the floor assembly and knife system pivot from the raised position to the lowered position in a direction downwardly and towards a rear of the baler.

12. The baler of claim 10, further comprising at least one roller coupled to the floor assembly or knife system for facilitating movement of the floor assembly and knife system along the first and second rails.

13. The baler of claim 10, wherein the knife system comprises a first plurality of knives and a second plurality of knives, the first plurality of knives and second plurality of knives being controllably disposed between engaged and disengaged positions.

14. The baler of claim 13, wherein the knife system comprises:
a first pair of actuators having at least one end coupled to a first shaft; and
a second pair of actuators having at least one end coupled to a second shaft;
wherein, the first plurality of knives are coupled to the first shaft and the second plurality of knives are coupled to the second shaft.

15. The baler of claim 14, wherein:
the first pair of actuators are controllably actuated to pivot the first shaft for moving the first plurality of knives between the engaged and disengaged positions; and
the second pair of actuators are controllably actuated to pivot the second shaft for moving the second plurality of knives between the engaged and disengaged positions.

16. The baler of claim 10, further comprising at least one actuator for controllably pivoting the floor assembly about the pivot, the actuator having a first end and a second end, wherein the first end is coupled to the floor assembly and the second end is coupled to the frame.

17. A baler, comprising;
a frame having a first end and a second end, the second end being rearward of the first end;
a pre-compression chamber;
at least one wheel supporting the frame, the at least one wheel located between the pre-compression chamber and a rear of the baler;
a first feeder assembly coupled to the frame and disposed towards the first end;
a second feeder assembly coupled to the frame, the second feeder assembly being disposed rearward of the first feeder assembly;
a material flow path defined at least between the first and second feeder assemblies;
a first floor assembly positioned at a lower portion of the material flow path;
a knife system coupled to the first floor assembly, the knife system including one or more knives oriented, at least in part, along the material flow path; and
a feeder fork system coupled to the frame and disposed rearward of the floor assembly, the feeder fork system including a second floor assembly coupled to the first floor assembly;
wherein, the second floor assembly is pivotably coupled to the frame about a pivot to move at least the first and second floor assemblies from a raised position to a lowered position in a direction downwardly and towards the at least one wheel located between the pre-compression chamber and the rear of the baler.

18. The baler of claim 17, wherein the pivot is located rearward of the first floor assembly and the second floor assembly such that at least the first floor assembly and the second floor assembly are pivotable from the raised position to the lowered position in a direction downwardly and towards a rear of the baler.

19. The baler of claim 17, wherein the knife system is coupled to the first floor assembly.

20. The baler of claim 17, wherein the first floor assembly and the second floor assembly are coupled to one another to form a substantially continuous floor structure.

21. The baler of claim 17, further comprising a first rail and a second rail coupled to the frame and being arranged substantially transverse to the material flow path, wherein the first floor assembly and knife system are movably coupled to the first and second rails.

22. The baler of claim 21, wherein the first floor assembly and knife system are slidable along the first rail and second rail between a first position and a second position, the first floor assembly and knife system being positioned along the material flow path in the first position, and the first floor assembly and knife system being spaced a lateral distance from the material flow path in the second position.

23. The baler of claim 21, wherein the first floor assembly and knife system are movable along the first and second rails independently of the second floor assembly.

* * * * *